(12) United States Patent  (10) Patent No.: US 8,324,557 B2
Klein et al.  (45) Date of Patent: Dec. 4, 2012

(54) OPTOELECTRONIC SENSOR FOR THE DETECTION OF PALLETS

(75) Inventors: Michael Klein, Waldkirch (DE); Christoph Märkle, Freiburg (DE); Bernhard Schindler, Simonswald (DE)

(73) Assignee: Sick AG, Waldkirch (DE)

( * ) Notice: Subject to any disclaimer, the term of this patent is extended or adjusted under 35 U.S.C. 154(b) by 436 days.

(21) Appl. No.: 12/656,628

(22) Filed: Feb. 5, 2010

(65) Prior Publication Data

US 2010/0219330 A1 Sep. 2, 2010

(30) Foreign Application Priority Data

Mar. 2, 2009 (EP) ...................................... 09100159

(51) Int. Cl.
G06M 7/00 (2006.01)
G08B 13/18 (2006.01)
(52) U.S. Cl. ........................................ 250/221; 340/555
(58) Field of Classification Search .................. 250/221; 340/555, 556, 557
See application file for complete search history.

(56) References Cited

U.S. PATENT DOCUMENTS

| | | | |
|---|---|---|---|
| 4,516,115 A * | 5/1985 | Frigon et al. | 340/556 |
| 4,742,337 A * | 5/1988 | Haag | 340/556 |
| 5,496,996 A | 3/1996 | Barnes et al. | |
| 5,608,207 A | 3/1997 | Allen et al. | |
| 5,880,954 A * | 3/1999 | Thomson et al. | 700/79 |
| 2007/0131850 A1* | 6/2007 | Cofer et al. | 250/221 |

FOREIGN PATENT DOCUMENTS

| | | |
|---|---|---|
| DE | 199 14 114 A1 | 10/1999 |
| EP | 0 891 044 B1 | 1/1999 |
| EP | 1 503 226 A2 | 2/2005 |

* cited by examiner

*Primary Examiner* — Thanh Luu
(74) *Attorney, Agent, or Firm* — Nath, Goldberg & Meyer; Jerald L. Meyer; Sanjana Mangalagiri

(57) ABSTRACT

The invention relates to an optoelectronic sensor having a transmitter (12) for the transmission of transmitted light (22), a receiver (14) for the reception of the transmitted light (28) and for the provision of an electronic received signal (I), an evaluation unit (16) for the recording of the received signal (I) and for the outputting of a detection signal when an opaque object (36) to be detected enters into the transmitted light beam. To provide an improved sensor with which in particular objects can be detected in an improved manner on which only some of the transmitted light is incident, it is proposed that the transmitted light profile (22) defines a detection zone extending transversely to the transmitted beam direction between the transmitter and receiver or reflector (26) and is received by the receiver (14), with a free beam path, via the reflector or directly by the receiver (14) and that the evaluation unit (16) has means for the determination and adjustment of a recognition threshold value (S) and that the detection signal can be output when the received signal (I) is beneath the recognition threshold value (S).

10 Claims, 3 Drawing Sheets

OPTOELECTRONIC SENSOR FOR THE DETECTION OF PALLETS

Figure 1:
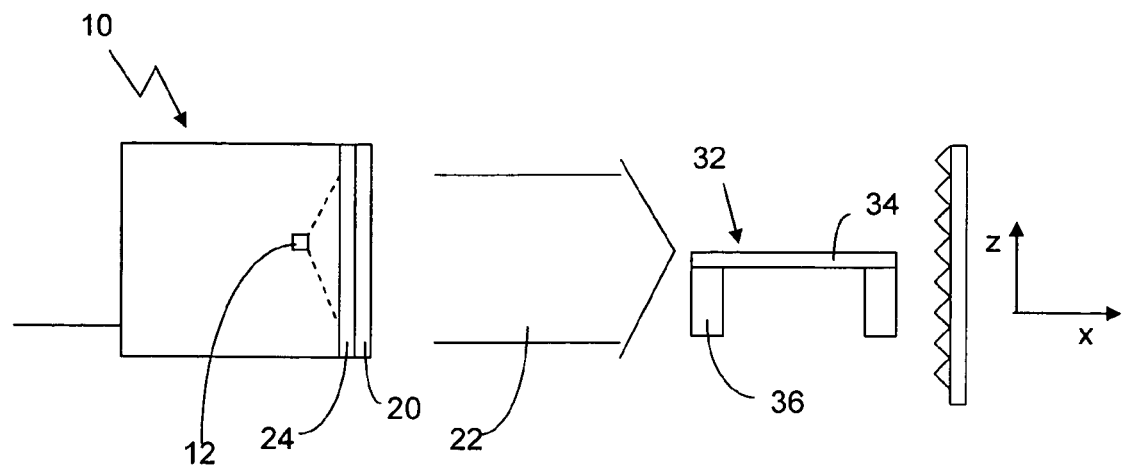

The invention relates to an optoelectronic sensor in accordance with the preamble of claim 1 as well as to a method for the operation of such a sensor in accordance with claim 9.

An optical sensor is known from EP 1 503 226 A2 which is designed as a light probe and has a transmitter for the transmission of transmitted light, a receiver for the reception of transmitted light reflected at an object and an evaluation unit in which the electronic signal of the receiver is evaluated and an object detection signal is output on the detection of reflected transmitted light at an object. In order also to be able to detect structured objects with which only some of the transmitted light beams are reflected back the receiver due to the structures, provision is made in accordance with EP 1 503 226 A2 that the transmitted light beams are expanded by a light scattering film, for example in a linear manner, so that the object to be detected is illuminated over a larger area and a sufficient refection for detection is available if an object is present. If therefore a minimum degree of reflected light is received, the receiver can determine this and an object detection signal is output.

A method is known from EP 0 891 004 B1 for the operation of an optoelectronic sensor in which, for the recognition of transparent objects such as glass bottles or the like, the received signal of the receiver is compared with a recognition threshold value and an object detection signal is output in dependence thereon. This recognition threshold value can be changed in dependence on the received signal so that, for example, a gradual contamination of the optical system can be countered up to a certain degree and an object recognition remains possible.

Starting from this prior art, it is the object of the invention to provide an improved optoelectronic sensor with which in particular opaque objects can be detected in an improved manner on which only some of the transmitted light is incident.

This object is satisfied by a sensor having the features of claim 1 as well as by a method for the operation of such a sensor having the features of claim 9.

Such an optoelectronic sensor has a transmitter for the transmission of transmitted light, a receiver for the reception of the transmitted light and for the provision of an electronic received signal as well as an evaluation unit for the recording of the received signal and for the outputting of a detection signal when an opaque object to be detected enters into the transmitted light beam. In accordance with the invention, the transmitted light profile defines a detection region extending transversely, in particular perpendicular, to the transmitted beam direction between the transmitter and receiver or reflector and is received, with a free beam path, via the reflector or directly from the receiver. Furthermore, the evaluation unit has means for the determination and adjustment of a recognition threshold value. The detection signal can be output when the received signal is below the recognition threshold value.

The essential advantage of the new sensor comprises the fact that a reliable detection of objects over a specific detection range is possible with it if said objects only interrupt a smaller portion of the transmitted light so that only slightly less light is received at the receiver than with a free beam path. A light barrier is thus provided which can reliably recognize even very small changes in the received light. The sensor in accordance with the invention can thus also replace light grids or light curtains which can likewise monitor a plane with discrete resolution which corresponds to the spacing of the individual beams with the light grid.

Such a sensor can particularly advantageously be used, for example, for the secure detection of pallets of different heights if namely the linear transmitted light profile is aligned perpendicular to the pallet, that is vertically as a rule, and if the transmitted light is interrupted by the pallet base. Either obliquely aligned conventional light barriers were previously used for such a detection which can, however, result in defective switching connections due to their working principle in the event of damaged pallets (lack of cover planks), or planar aligned light grids were used which can likewise basically detect objects which interrupt the individual beams of the light grid over a linearly extended region with a certain resolution. The sensor in accordance with the invention, however, has a number of advantages, however, in that it admittedly provides the increased security of a light grid, but is, in contrast, less expensive and has an increased switching frequency since a plurality of light beams does not have to be evaluated. The sensor in accordance with the invention furthermore has a continuous detection plane and no grid dimension like a light grid. Any adjustment demand required for individual beams of a light grid is omitted.

In a simple embodiment of the invention, the receiver can be made as a simple cost-favorable photodiode since due to the tracing of the recognition threshold value no spatial resolution is required at the receiver and nevertheless smaller changes of the received light are recognized.

In a further development of the invention, an optical transmission system is associated with the transmitter and/or an optical reception system is associated with the receiver to obtain the desired transmitted light profile and a desired range of view for the receiver.

The desired transmitted light profile preferably comprises an approximately parallel transmitted light beam extent since the received signal is then independent of the position of the object to be detected in the beam path.

The construction space (spacing between the transmitter or receiver and the associated lens) required for this purpose due to the optical constraints can be reduced by the use of a Fresnel lens.

The transmitter, receiver and evaluation unit are advantageously arranged together in a sensor housing which is covered by a front screen through which the transmitted light and the received light pass.

The front screen can have light absorbing patterns at least in one section through which the transmitted light or the received light passes, said light absorbing patterns serving to homogenize transmitted light or received light of linear shape in cross-section so that the same light intensity is present over the total line where possible.

To prevent optical crosstalk within the sensor housing from the transmitter to the receiver, an optical dividing wall is provided in a further development of the invention between the transmitter and, where applicable, the optical transmission system and the receiver and, where applicable, the optical reception system.

The object in accordance with the invention is also satisfied by a method for the operation of an optoelectronic sensor having the following method steps:
  transmitting parallel transmitted light expanded transversely to the transmitted light beam direction into a monitored zone;
  receiving the transmitted light by a receiver and providing an electronic received signals, with the transmitted light being received, with a free beam path, via the reflector or directly from the receiver.

comparing the received signal with a partial interruption of the transmitted light by an opaque object to be detected with a recognition threshold value which corresponds to a fixed percentage of the received signal with a free beam path;

outputting a detection signal in dependence on this comparison, adjusting the recognition threshold value after the lapse of a specific time.

An adjustment of the recognition threshold value is given by this method in accordance with the invention which is skilful, because it is relatively simple, and which allows a reliable detection of objects which only interrupt a smaller portion of the transmitted light, also outside clean room conditions. In this respect, the received signal is measured at specific time intervals with a free beam path and a fixed percentage thereof is always defined as a new recognition threshold value. In this manner, long-term effects such as gradual contamination of the optical system or ageing processes can be effectively eliminated.

The received signal can be automatically taught a first time with a free beam path in an initial teach-in phase. This teach-in phase can; for example, be triggered manually.

Figure 2:
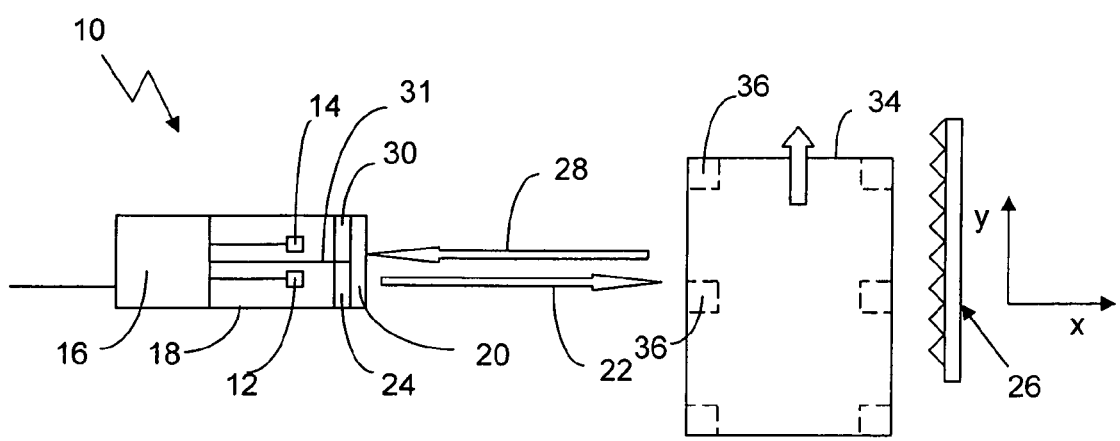
Figure 3:
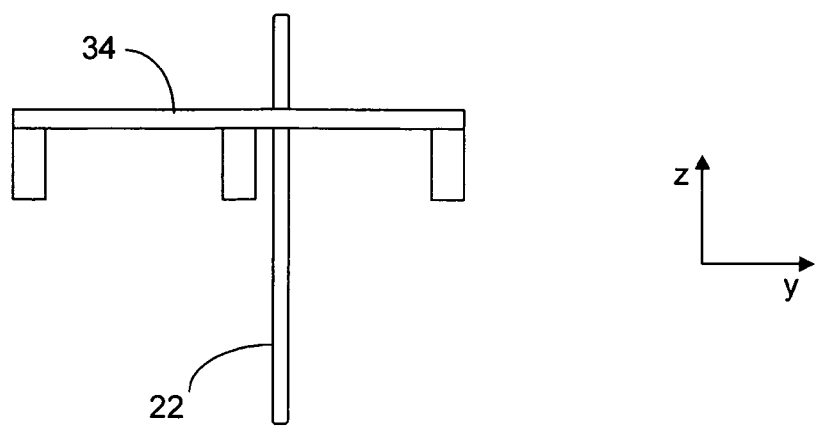
Figure 4:
Figure 5:
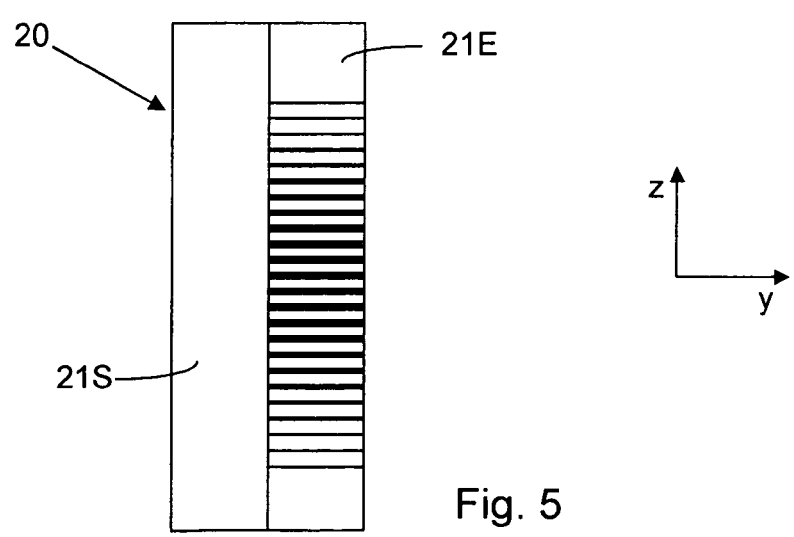
Figure 6:
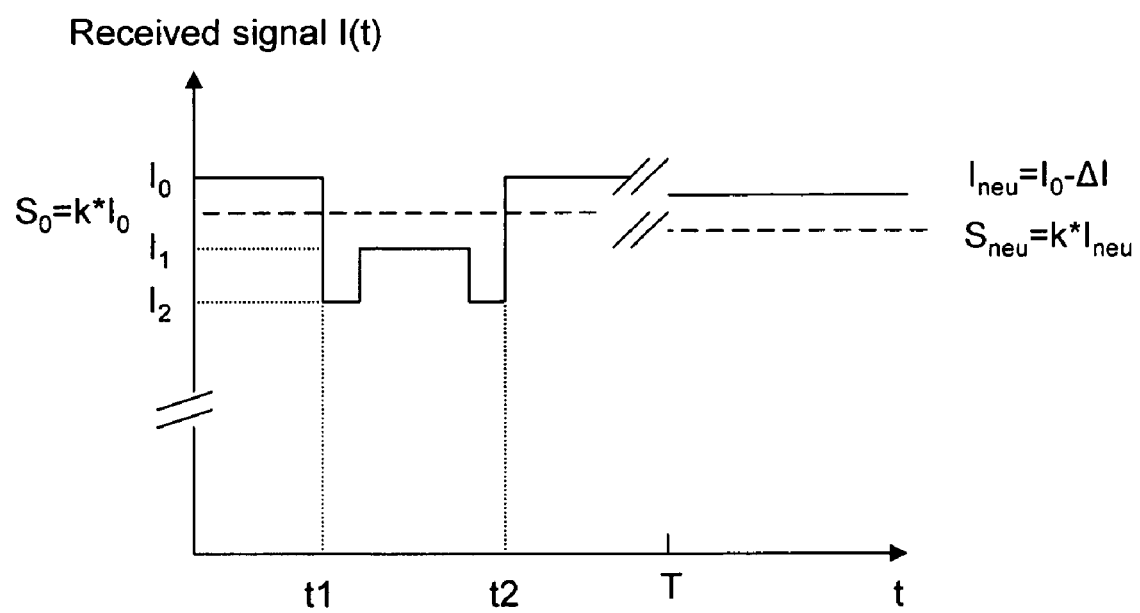

The invention will be described in detail in the following with reference to an embodiment and to the drawing. There are shown in the drawing:

FIGS. 1 and 2 a schematic representation of the sensor in accordance with the invention in an application from two different directions;

FIGS. 3 and 4 beam profiles of the transmitted light;

FIG. 5 a schematic representation of an embodiment of a front screen;

FIG. 6 a schematic diagram of the time extent of the received signal for the illustration of the operation of the sensor in accordance with the invention.

A sensor 10 in accordance with the invention is designed as a light barrier and is shown by way of example as a reflection light barrier in FIGS. 1 and 2. The sensor 10 has a transmitter 12, a receiver 14, designed as a photodiode, for example, and an evaluation unit 16. The transmitter 12, the receiver 14 and the evaluation unit 16 are arranged in a common sensor housing 18 which is covered by a front screen 20 at the front side. The transmitted light 22 transmitted by the sensor 10 is expanded approximately in linear form by an optical transmission system 24 which is associated with the transmitter 12 so that the transmitted light exiting the sensor has an approximately linear transmission profile as is shown in FIGS. 3 and 4. In this connection, the transmitted light 22 exiting the sensor 10 has an approximately parallel transmitted light beam extent such as can be recognized schematically from the representation in FIG. 1. In accordance with the embodiment in accordance with FIG. 3, the transmitted light 22 is almost rectangular in cross-section, with it being a very narrow rectangle to obtain the linear shape. The transmitted light profile in the embodiment in accordance with FIG. 4 is formed in linear fashion by an elongated elliptical shape. The transmitted light profile is determined by the optical transmission system 24 which can be designed as a Fresnel lens, for example, whereby the spacing between the transmitter 12 and the optical transmission system 24 can be kept to a minimum to reduce the construction space.

The linear shape of the transmitted light 22 can likewise be recognized in FIGS. 1 and 2, with the transmitted light being very narrow in the perspective of FIG. 1 and being very wide in the perspective of FIG. 2 so that the transmitted light is therefore formed in linear shape in the z direction and is aligned vertically perpendicular to the transport direction y.

With a free beam path, the transmitted light 22 is incident on a retroreflector 26 and is reflected back by this in the same direction to the sensor 10 and is received there as received light 28 by the receiver 14 which has an optical reception system 30 arranged in front of it. The optical reception system 30 focuses the likewise linear received light 28 onto the receiver 14 formed as a photodiode.

So that no optical crosstalk can take place from the transmitter to the receiver within the housing, an optical dividing wall 31 is preferably provided which separates the transmission channel and the reception channel in the sensor housing 18. The received light is converted in the receiver 14 into an electronic received signal which is recorded by the evaluation unit 16. The received signal is therefore evaluated in the evaluation unit as to whether an opaque object is present in the transmitted light 22 or not and a detection signal is output as required.

In the embodiment in accordance with FIGS. 1 and 2, the sensor 10 in accordance with the invention serves for the detection of pallets 32. A pallet 32 has a pallet base 34 and pallet feet 36. The optoelectronic sensor 10 is now aligned such that the transmitted light line extends perpendicular to the pallet base 34 so that the pallet base 34 is transported through the transmitted light 22 on the transport of the pallet 32 in the y direction (see also FIG. 3).

Since the pallet base 34 has a relatively small extent in comparison to the extent of the transmitted light 22 in the z direction, it only interrupts the transmitted light section-wise so that a large portion of the transmitted light always reaches the reflector 26 and is reflected back into the receiver 14. It is therefore a particular object of the sensor in accordance with the invention to recognize a relatively small intensity change and to output a detection signal as reliably and as securely as possible when at least the pallet base 34 of a pallet 32 is located in the beam path. For this purpose, the sensor 10 works as explained in the following with reference to FIG. 6:

At the start, with a free beam path, the received intensity is first determined at the receiver 14 and the corresponding electronic received signal $I_0$ is stored. Then, a recognition threshold value $S_0$ is fixed in the evaluation unit 16 which corresponds to a fixed percentage of the received signal with a free beam path.

$$S_0 = k^* I_0 \text{ where } k<1$$

This recognition threshold value $S_0$ must, however, be higher than a received signal $I_1$ which corresponds to the received intensity when at least the pallet base 34 is located in the beam path of the transmitted light 22, for example in the time between t1 and t2. It is then ensured that a pallet is present if the recognition threshold value $S_0$ is fallen below. This naturally also applies when a pallet foot 36 should also enter into the beam path since the signal $I_2$ then received is still smaller than the received signal $I_1$ when only the pallet base 34 is in the transmitted light 22.

After the end of a specific time T, this may be a plurality of seconds, for example, or even minutes or hours, the received signal $I_{new}$ is automatically determined again with a free beam path, that is without pallets, and the previous value for $O_0$ stored in the evaluation unit 16 is overwritten. Starting from this new received signal $I_{new}$ with a free beam path a new recognition threshold value $S_{new}$ is calculated with the same percentage and is stored as a new recognition threshold value $S_{new}$.

$$S_{new} = k^* I_{new}$$

Work is continued with this new recognition threshold value $S_{new}$ until, after a renewed time lapse, a new recognition threshold value is again determined in the same manner. The recognition threshold value is adjusted over and over again in this manner. If the time interval T is very short, for example seconds, the adjustment is even quasi-continuous.

As already explained above, a respective transmitted light profile is shown schematically in cross-section in FIGS. 3 and 4. So that the recognition of a pallet base 34 located in the beam path 22 is independent of the location of the occurrence of the pallet base 34, the received signal 11 should be independent of the x and z positions.

To ensure the independence in the z direction, that is along the transmitted light line, the transmitted light should be homogeneous, which makes high demands on the optical transmission system. They can, however, be reduced if the homogenization can be effected in a different manner. For this purpose, provision is made in a further development of the invention that the front screen is printed in the manner of a pattern in the region 21S through which the transmitted light 22 passes through the front screen 20 or in the region 21 E through which the received light 28 passes through the front screen 20 so that ultimately the light transmitted by the sensor and received again is attenuated to different degrees in different regions of the front screen so that ultimately a homogenization of the transmitted light takes place in the z direction from the viewpoint of the receiver 14. The patterns for the printing of the front screen can be formed in different manners. A stripe pattern is shown by way of example in FIG. 5 which attenuates the transmitted light more centrally in the z direction than upwardly or downwardly toward the margins. A printing of only the receiver-side region 21E is advantageous since then the transmitted light emerges at full luminous intensity and reflections of the transmitted light at an object, e.g. at the pallet base 34, can be more easily recognized with the naked eye for adjustment purposes.

The independence in the x direction is ensured in that the transmitted light 22 transmitted by the sensor 10 is aligned parallel through the optical transmission system 24.

An optoelectronic sensor is thus provided overall with which an object can be detected when it is located in the detection zone specified by the transmitted light beam path 22 and extended in the z direction, with the opaque object having to cause a certain minimum coverage of the transmitted light so that the received signal for the detection falls below a preset threshold.

The invention claimed is:

1. An optoelectronic sensor for the detection of pallets (32) having a transmitter (12) and an optical transmission system (24) for the transmission of transmitted light (22), a receiver (14) for the reception of the transmitted light (28) and for the provision of an electronic received signal (I), an evaluation unit (16) for the recording of the received signal (I) and for the outputting of a detection signal when an opaque object (36) to be detected in the form of a pallet base (34) enters into the transmitted light beam (22), whereby the optical transmission system (24) is constructed so that the transmitted light profile (22) has the form of a line and defines a plane detection zone between the transmitter and the receiver or reflector (26) across the pallet base (34) and is detected, with a free beam path, via a reflector (26) or directly by the receiver (14); and whereby the evaluation unit (16) has means for the determination and adjustment of a recognition threshold value (S); and whereby the detection signal can be output when the received signal (I) is below the detection threshold value (S) if the pallet base (34) intercepts only a part of the transmitted light (22) having the line form.

2. A sensor in accordance with claim 1, characterized in that the receiver (14) is designed as a simple photodiode.

3. A sensor in accordance with claim 1, characterized in that an optical reception system (30) is associated with the receiver (14).

4. A sensor in accordance with claim 3, characterized in that the transmitted light is given an approximately parallel transmitted light beam extent by the optical transmission system (24).

5. A sensor in accordance with claim 3, characterized in that the optical transmission and/or reception system (24, 30) has a Fresnel lens.

6. An optoelectronic sensor in accordance with claim 1, characterized in that at least the transmitter (12) with the optical transmission system (24) is arranged in a sensor housing (18) having a front screen (20) and the front screen (20) is printed section-wise with patterns absorbing transmitted light for the homogenization of transmitted light.

7. An optoelectronic sensor in accordance claim 6, characterized in that the transmitter (12), the receiver (14) and the evaluation unit (16) are arranged together in the sensor housing (18).

8. An optoelectronic sensor in accordance with claim 7, characterized in that an optical dividing wall (31) is provided between the transmitter (12), with its optical transmission system (24), and the receiver (14).

9. A method for the detection of pallets (32) with an optoelectronic sensor having a transmitter (12) and an optical transmission system (24) for the transmission of transmitted light (22), a receiver (14) for the reception of the transmitted light (28) and for the provision of an electronic received signal (I), an evaluation unit (16) for the recording of the received signal (I) and for the outputting of a detection signal when an opaque object (36) in the form of pallet base (34) to be detected enters into the transmitted light beam (22), the method comprising the following steps:

transmitting parallel transmitted light (22) expanded in form of a line and transversely to the transmitted light beam direction into a plane monitored zone;

receiving the transmitted light (22) by a receiver (14) and providing an electronic received signal (1), with the transmitted light (22) being received, with a free beam path, directly by the receiver (14) or via a reflector (26);

comparing the received signal (I) on a partial interruption of the transmitted light (22) by an opaque object (36) to be detected in the form of a pallet base (34) with a recognition threshold value (S) which corresponds to a fixed percentage of the received signal with a free beam path;

outputting a detection signal in dependence on this comparison;

adjusting the recognition threshold value (S) after the lapse of a specific time (T).

10. A method in accordance with claim 9, characterized in that, after the lapse of a specific time (T), the received signal (I) is determined again with a free beam path and the recognition threshold value (S) is adapted to this for the adjustment.

* * * * *